United States Patent [19]

Masaki et al.

[11] Patent Number: 5,631,819
[45] Date of Patent: May 20, 1997

[54] POWER CONVERTER

[75] Inventors: Ryoso Masaki; Takashi Ikimi, both of Hitachi; Hironori Ohashi, Funabashi; Yuusuke Takamoto, Hitachi; Seiji Ishida, Funabashi; Sanshiro Obara, Toukai-mura, all of Japan

[73] Assignee: Hitachi, Ltd., Japan

[21] Appl. No.: 633,000

[22] Filed: Apr. 16, 1996

[30] Foreign Application Priority Data

Apr. 17, 1995 [JP] Japan ................. 7-115057

[51] Int. Cl.$^6$ ............... H02M 7/537; H02M 7/538
[52] U.S. Cl. ............... 363/132; 363/41; 318/811
[58] Field of Search ............ 363/41, 132, 137; 318/811

[56] References Cited

U.S. PATENT DOCUMENTS

| | | | |
|---|---|---|---|
| 3,603,867 | 9/1971 | Cuenoud | 363/42 |
| 4,321,663 | 3/1982 | Krtek | 363/41 |
| 4,480,301 | 10/1984 | Pfaff et al. | |
| 5,023,538 | 6/1991 | Mutoh et al. | 318/811 |
| 5,436,819 | 7/1995 | Mikami et al. | 363/132 |
| 5,550,450 | 8/1996 | Palko et al. | 363/41 |

FOREIGN PATENT DOCUMENTS

| | | |
|---|---|---|
| 2-285967 | 11/1990 | Japan . |
| 3-107373 | 5/1991 | Japan . |

*Primary Examiner*—Stuart N. Hecker
*Attorney, Agent, or Firm*—Evenson, McKeown, Edwards & Lenahan P.L.L.C.

[57] ABSTRACT

The invention provides an electric power converter system which uses a standard low-priced control processor and is suitable for improving the voltage utilization factor in the output voltage. D-axis and q-axis voltage commands and a rotation angle θ defining a voltage command vector on a rotating coordinate system are input to a voltage calculation circuit. The voltage command vector is transformed in a rotating coordinate transformation unit into a α axis and β axis voltage commands to be defined relative to stationary coordinate system. A judgment unit determines which section contains the voltage command vector, from among three sections on the stationary coordinate system having one axis thereof (α-axis for example) coinciding with one axis of the three phases. A three phase voltage generation unit then selects a method of calculation on the basis of a result of the section determination, and calculates three phase voltage command values respectively utilizing the α axis and β axis voltage command values. Since calculation requires only a simple add/subtract and shift operation, a high performance economical power converter system which improves the voltage utilization factor substantially can be realized.

14 Claims, 9 Drawing Sheets

COORDINATE TRANSFORM

101: $V\alpha \leftarrow Vd\cos\theta - Vq\sin\theta$

102: $V\beta \leftarrow Vd\sin\theta + Vq\cos\theta$

103: $V\beta 3 \leftarrow V3/\sqrt{3}$

RETURN

POWER CONVERTER

BACKGROUND OF THE INVENTION

The present invention relates to a power converter for converting a DC power supply voltage into three phase output voltages having an improved voltage utilization factor.

In prior art methods for improving the voltage utilization factor, the same auxiliary voltage value is added to each phase of three phase output voltage commands to obtain each PWM signal, and space vectors are calculated from switching conditions in the power converters. As used herein, improving the voltage utilization factor refers to any method by which a relatively large line-to-line voltage in a sinusoidal wave can be obtained, although its phase voltage produced is low.

Known processes of the above type are described, for example, in JP-A Laid-Open No. 3-107373, U.S. Pat. No. 4,321,663 and JP-A Laid-Open No. 2-285967. JP-A Laid Open No. 3-107373 describes a method to improve the voltage utilization factor (efficient modulation method of output voltage) through the steps of identifying the one of three phase output voltage commands which has an intermediate magnitude of voltage thereamong, and adding to each phase a voltage which is obtained by multiplying the one thus identified by ½. U.S. Pat. No. 4,321,663 and JP-A Laid Open No. 2-285967 are based on the same concept to obtain PWM signals in an identical manner.

A typical example of the known methods of producing PWM signals utilizing the space vectors, is described in U.S. Pat. No. 4,480,301. Taking into account eight switching states (seven with respect to voltage space vectors) available for the three phase power converter, this prior art method combines these eight switching states for respective time duration in order to obtain desirable voltage vector commands. By this method, the voltage utilization factor can be improved as well.

One method for controlling three phase AC motors is generally known as the vector control method, in which voltage command vectors are calculated in a rotating coordinate system. This method is particularly advantageous for a high output frequency of the power converter. Further, when the output frequency of the power converter increases, the speed of the motor as well as the voltage to be applied also increase, so that a substantial improvement in the voltage utilization factor becomes necessary.

Under such circumstances, according to the above prior art processes, after calculation of respective three phase voltage commands utilizing the voltage command vector on the rotating coordinate system obtained by vector control, the auxiliary voltage to be added to each phase must be calculated from these phase voltage commands. Then, it is necessary to add the auxiliary voltage thus obtained to each phase, and to process PWM signal generation. In this case, since extensive arithmetic operation must be carried out in order to improve the voltage utilization factor, when a conventional microprocessor is used, substantial processing time is required.

Further, in the prior art method in the latter case described above, it is necessary to select a switching state, calculate its duration, and output the same for each cycle of the PWM signal (for example, at every 100 μs for switching frequency of 10 kHz). This method is advantageous in that it can generate PWM signals directly. However, it also suffers from the disadvantages that the process cycle for calculation required is short, and that substantial processing time is required to judge conditions and calculate the duration. Thus, use of a high performance microprocessor becomes essential.

SUMMARY OF THE INVENTION

One object of the present invention is to provide a power converter which achieves an improved voltage utilization factor in the output voltage, using a low-priced control arithmetic processing unit or microprocessor.

The above-mentioned object is accomplished by the power converter according to the invention, in which a control unit calculates three phase voltage command values using a given voltage command vector to generate associated PWM signals, and a plurality of switching elements converts a DC power supply voltage into three phase output voltages according to the PWM signals. The control unit comprises: a coordinate transformation arrangement for transforming the given voltage command vector to voltage command values on orthogonal $\alpha$ and $\beta$ axes in a stationary coordinate system; means for determining which section of the stationary coordinate system contains the given voltage command vector; and a three phase voltage calculation arrangement which varies the manner of calculation on the basis of a result of the section determination, and calculates the three phase voltage command values using the voltage command values of the $\alpha$ axis and $\beta$ axis.

In the control unit according to the invention, the voltage command vector in a rotating coordinate system is transformed to a stationary coordinate system by calculating corresponding voltage command values which are projected on the orthogonal $\alpha$ and $\beta$ axes of the stationary coordinate system. If only these voltage command values of $\alpha$ and $\beta$ axes are further processed for two phase-to-three phase conversion in the same complicated manner as the prior art using a high performance, high-priced microcomputer, there will be no particular advantage distinct from the conventional method. However, according to the invention, there is added the step of using the voltage command values of the $\alpha$ and $\beta$ axes to determine which of several predetermined sections of the stationary coordinate system contains the voltage command vector given in the rotating coordinate system. Based on the result of this determination, the contents of subsequent calculations are adapted to simplify the calculation procedure. In particular, at this instant, one of the axes of the stationary coordinate system (the $\alpha$ axis in this example) is adapted to coincide with one of the axes of the three phases. At the same time, a voltage command value on $\beta$ axis is multiplied by a number predetermined to produce a $\beta$ axis transformed command value for comparison with the $\alpha$ axis voltage command value. Thereafter, the one of the several sections of the stationary coordinate system which contains the given voltage command vector is identified based on the relationship of signs of values compared and the magnitudes of the absolute values thereof. For each section identified as above, a different method is provided for calculating the respective three phase output voltage command values, utilizing the $\beta$ axis transformed command value and the $\alpha$ axis voltage command value in such a manner that absolute values of output voltage of predetermined two phases coincide with each other.

As described above, the voltage command values which improve the voltage utilization factor can be obtained directly through the computational steps according to the invention. In addition, since such computation can be executed through a simple add/subtract and shift operation, a standard low-priced microprocessor with a relatively low throughput can be adopted, thereby advantageously lowering the production cost of the overall control unit.

Other objects, advantages and novel features of the present invention will become apparent from the following detailed description of the invention when considered in conjunction with the accompanying drawings.

BRIEF DESCRIPTION OF THE DRAWINGS

FIG. 7(a) and (b) are voltage vector diagrams illustrating how the voltage utilization factor is improved through the processing steps FIG. 6;

FIG. 12(a) and (b) are voltage vector diagrams illustrative of a relationship between the voltage command vector and its components as reduced to respective phases in respective sections obtained through calculation by the process of FIG. 11;

DETAILED DESCRIPTION OF THE DRAWINGS

Preferred embodiments of the invention will be described in detail with reference to the accompanying drawings in the following.

Figure 1:
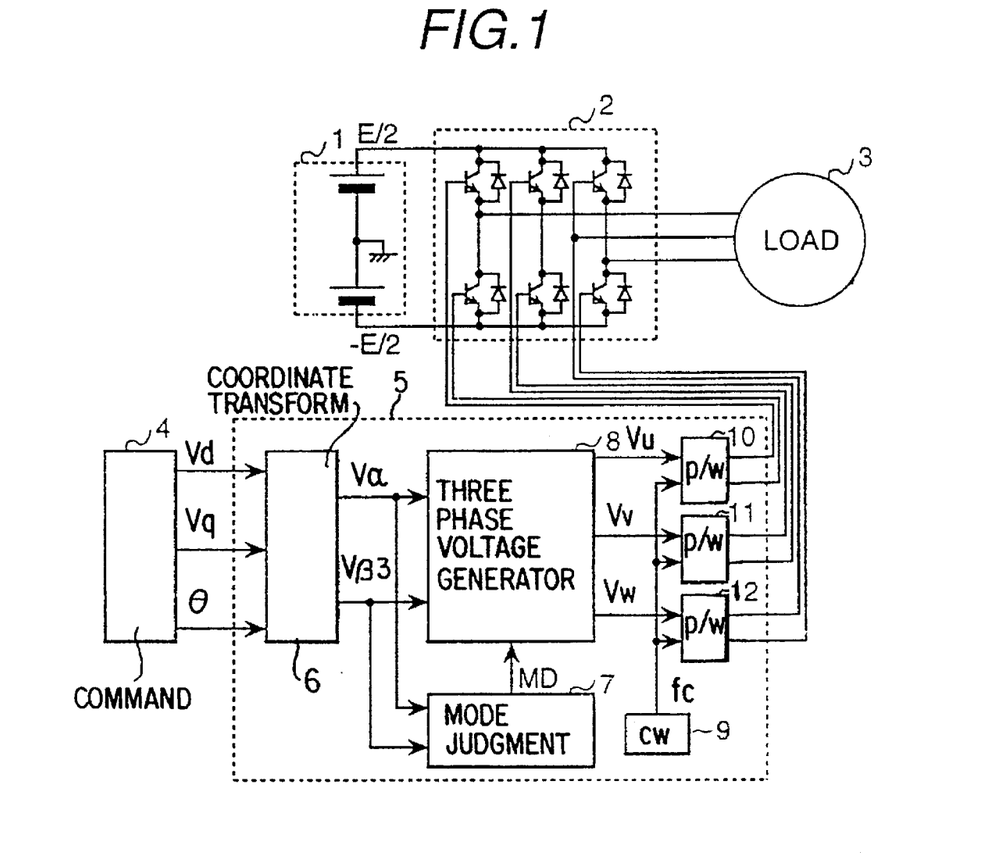
FIG. 1 is a schematic block diagram of a first embodiment of the invention.

FIG. 1 is a block diagram of an electric power converter according to a first embodiment of the invention. This electric power converter is comprised of power supply 1, three phase power converter circuit 2, three phase AC motor 3 as a load, rotating coordinate system voltage command circuit 4, and a voltage calculation circuit which functions as a control unit. These components collectively constitute a motor drive system which supplies energy from power supply 1 via three phase power converter circuit 2 to three phase AC motor 3.

In this embodiment, power supply 1 is depicted as a battery, but is not limited thereto, and may be a rectifier circuit for rectifying a commercial power supply. Further, rotating coordinate system voltage command circuit 4 is a voltage command circuit which controls the three phase AC motor 3 by the well-known vector control method, through feedback control computation of motor speed and motor current for three phase AC motor 3. It outputs d-axis voltage command Vd and q-axis voltage command Vq defined on a rotating coordinate system, as well as a rotation angle θ of the rotating coordinate system defined relative to a corresponding stationary coordinate system. Here, d-axis is assumed to coincide with an axis of the rotating flux of the AC motor, and q-axis to be orthogonal thereto. These outputs from the voltage command circuit 4 are input into voltage calculation circuit 5, where PWM signals for producing three phase AC voltages are calculated to control power converter circuit 2. Thereby, three phase AC motor can be driven with a torque as desired.

Now, processing procedures in voltage calculation circuit 5 will be described in detail in the following. This voltage calculation circuit 5 includes rotating coordinate transformation unit 6, mode judgment unit 7, three phase voltage generation unit 8, carrier wave generator 9, and PWM signal generators, 10, 11, 12.

The computation method utilized in the three phase voltage generation unit 8 will be explained later. The respective voltage command values $V_u$, $V_v$, $V_w$ output therefrom are compared with carrier wave $f_c$ output from carrier wave generator 9 in PWM signal generators 10, 11, 12, respectively, then depending on which is greater or smaller, each PWM signal is generated. PWM signals thus obtained are input into power converter circuit 2. Carrier wave generator 9 and PWM signal generators 10, 11, 12 in this arrangement are well known conventional elements.

Figure 2:
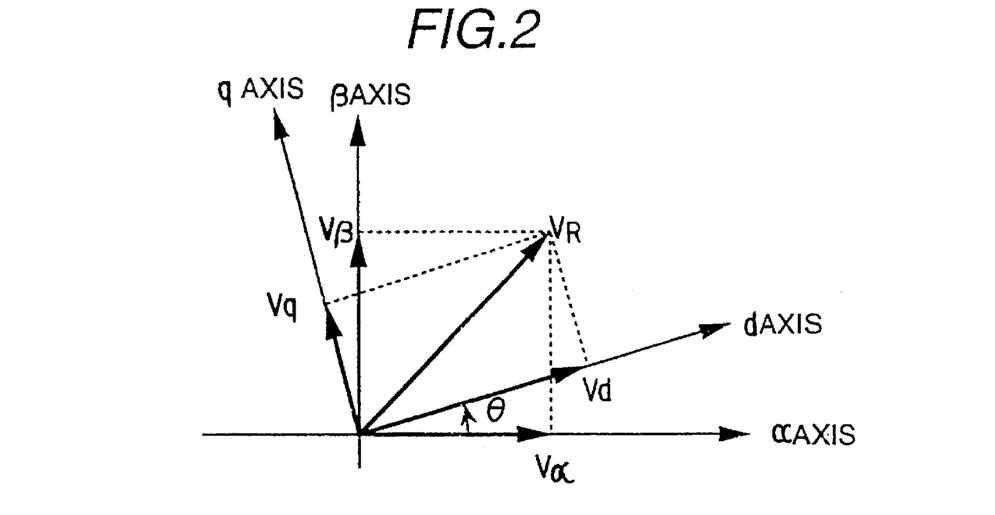
FIG. 2 is a vector diagram indicating a relationship between input and output voltages through rotating coordinate transformation unit 6 in FIG. 1.
Figure 3:
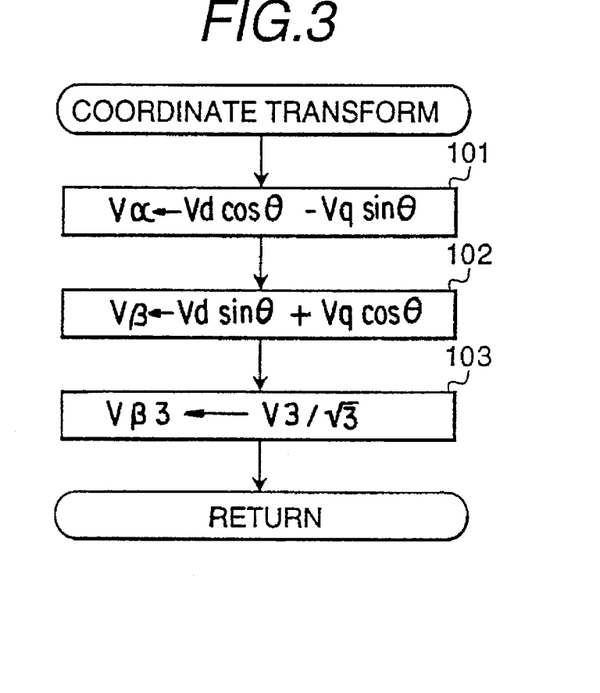
FIG. 3 is a flowchart indicating processing steps in the rotating coordinate transformation unit 6.

The processing procedures in the voltage calculation circuit 5, in which the main features of the invention reside, will now be described. Rotating coordinate transformation unit 6, in response to d-axis voltage command $V_d$, q-axis voltage command $V_q$ and rotation angle θ, calculates α-axis voltage command $V_\alpha$ and β-axis voltage command $V_\beta$ which are vector components thereof projected on the stationary coordinate system. The relationship between these corresponding voltage commands is shown in FIG. 2. The d-axis of the rotating coordinate system is shown to have rotated from the α-axis of the stationary coordinate system by angle θ, and continues to rotate along with the rotation of the rotating field of the AC motor at rotation angle θ. Voltage command vector $V_R$, given as a vector sum of $V_d$ and $V_q$ in the rotating coordinate system, is projected for coordinate transformation to the stationary coordinate system to obtain a-axis voltage command component $V_\alpha$ and β-axis voltage command component $V_\beta$. The processing steps in rotating coordinate transformation unit 6 are shown in the flowchart of FIG. 3. In steps 101 and 102 α-axis voltage command $V_\alpha$ and β-axis voltage command $V_\beta$ are calculated, respectively. (These formulas can be obtained easily from the vector diagram of FIG. 2.)

Next, in step 103, β-axis voltage command $V_\beta$ is multiplied by $1/\sqrt{3}$ to obtain β-axis voltage comparison value $V_{\beta 3}$. According to the invention, the purpose of step 103 is to simplify substantially the calculation loads and to facilitate calculation in the mode judgment unit 7 as well as in the three phase voltage generation unit 8 (as discussed in detail hereinbelow). Thus, as shown in FIG. 1, instead of β-axis voltage command $V_\beta$, β-axis voltage comparison value $V_{\beta 3}$ is actually output from unit 6.

Figure 4:
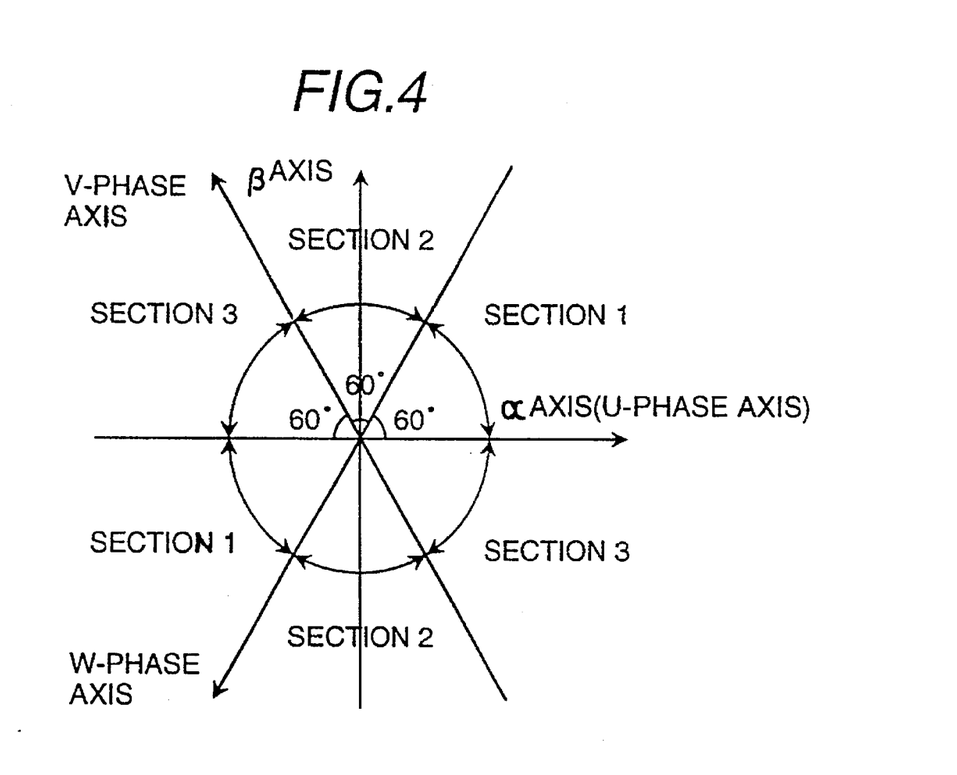
FIG. 4 is a vector space representing three sections in quadrants to be determined by mode judgment unit 7 when improving the voltage utilization factor.

Mode judgment unit 7 determines which of three sections in the quadrants of FIG. 4 contains the voltage command vector VR given in FIG. 2. As shown in FIG. 4, section 1 is defined as the regions from the α-axis to a 60° axis, and from 180° axis to 240° axis; section 2 is defined as the regions from 60° to 120° and from 240° to 300°; and section 3 is defined as the regions from 120° to 180°, and from 300° to 360°. Further, the α-axis is arranged to coincide with the U-phase axis, while the V-phase axis and the W-phase axis are arranged at 120° and 240° respectively relative to α-axis.

Figure 5:
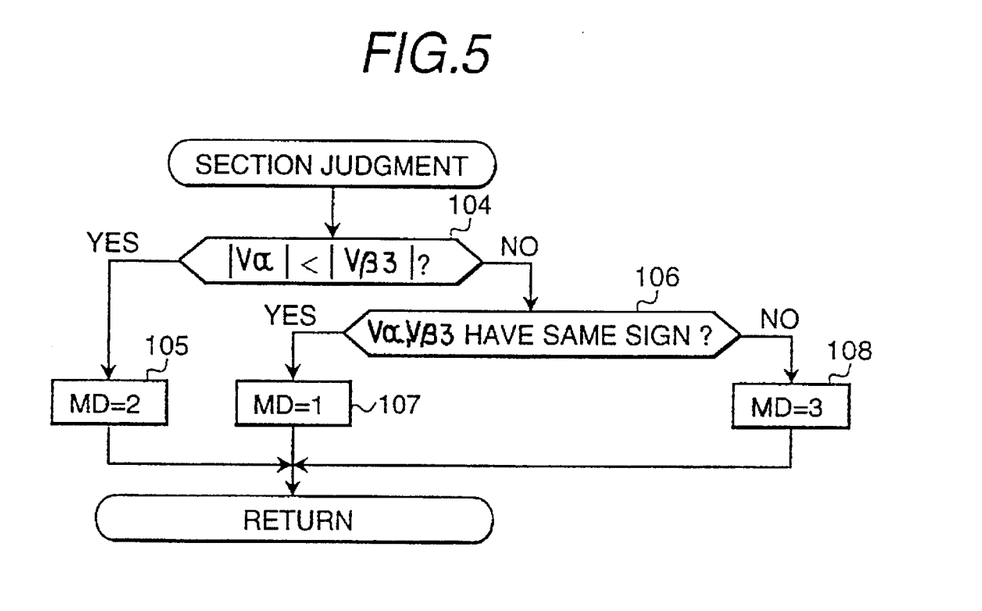
FIG. 5 is a flowchart indicating processing steps executed in the mode judgment unit 7 in order to improve the voltage utilization factor.

Contents of the processing in mode judgment unit 7 are shown in a flowchart of FIG. 5. In step 104, absolute values of the α axis voltage command $V_\alpha$ and the β axis voltage comparison value $V_{\beta 3}$ are compared. If the absolute value of β axis voltage comparison value $V_{\beta 3}$ is greater than the absolute value of α axis voltage command $V_\alpha$, the vector is judged to be in section 2, and mode signal MD is set to equal 2 in step 105.

The basis for this comparison is as follows: when the voltage command vector $V_R$ lies exactly on V-phase axis, the relationship between the α axis voltage command $V_\alpha$ and the β axis voltage command $V_\beta$ is expressed by equation 1.

$$V_\beta = -(\sqrt{3})V_\alpha \qquad \text{eq. 1}$$

Further, when $V_R$ lies on W-phase axis, the relationship between $V_\alpha$ and $V_\beta$ is expressed by equation 2.

$$V_\beta = (\sqrt{3})V_\alpha \qquad \text{eq. 2}$$

Therefore, when voltage command vector $V_R$ is in section 2 (that is, between the W and V axes), the α axis voltage command $V_\alpha$ and the β axis voltage command $V_\beta$ should satisfy the following inequality relationship 3.

$$|V_\beta| > (\sqrt{3})|V_\alpha| \qquad \text{eq. 3}$$

Thus, if the β axis voltage comparison value $V_{\beta 3}$ is used instead of β axis voltage command $V_\beta$, whether or not the vector $V_R$ is in section 2 can be determined in step 104 simply by comparing which is greater or smaller (as between $V_{\beta 3}$ and $V_\alpha$).

If the absolute value of the β axis voltage comparison value $V_{\beta 3}$ is smaller than the absolute value of α axis voltage command $V_\alpha$ in step 104, the process jumps to step 106. (If $|V_\alpha|=|V_{\beta 3}|$, either section adjacent thereto may be selected). In step 106, it is determined whether the vector $V_R$ is in section 1 or section 3. As can be understood from FIG. 4, since section 1 exists in the first and third quadrants while section 3 exists in the second and fourth quadrants, it is possible to determine in which section the vector exists from the signs of the α axis voltage command $V_\alpha$ and the β axis voltage comparison value $V_{\beta 3}$. Namely, if the α axis voltage command $V_\alpha$ and the β axis voltage comparison value $V_{\beta 3}$ are found to have the same sign in step 106, $V_R$ is determined to reside in the first quadrant (section 1), and accordingly, mode signal MD is set at 1 in step 107. If they are found to have different signs, the process jumps to step 108 where mode signal MD is set at 3.

Figure 6:
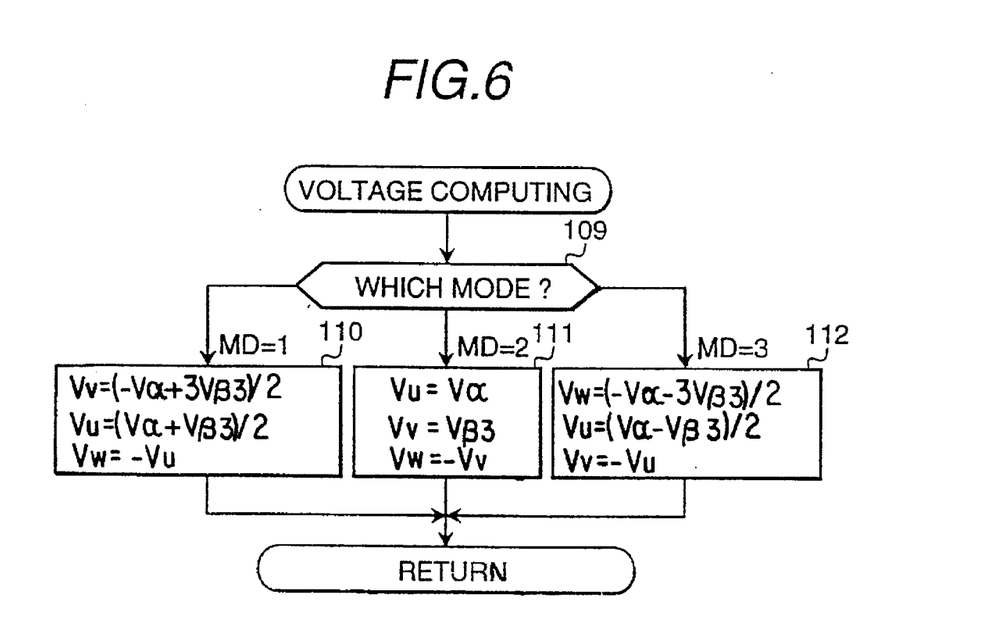
FIG. 6 is a flowchart indicating calculation methods to calculate respective voltage command values to be executed in three phase voltage generation unit 8 in order to improve the voltage utilization factor.

In response to the α axis voltage command $V_\alpha$ and the β axis voltage comparison value $V_{\beta 3}$ computed and output from rotation coordinate transformation unit 6, as well as the mode signal MD obtained in mode judgment unit 7, three phase voltage generation unit 8 computes respective voltage commands $V_u$, $V_v$, $V_w$ in order to improve the voltage utilization factor. Contents of such computation are shown in FIG. 6. FIG. 7(a) and (b) are vector diagrams to explain computation procedures for vector transformation.

When mode signal MD is determined in step 109 to be 1 (that is, when VR is identified to belong to section 1 as shown in FIG. 6), computation of step 110 is executed as follows:

$$V_v = (-V_{\alpha}+3V_{\beta 3})/2 \qquad \text{eq. 4}$$

$$V_u = (V_\alpha+V_{\beta 3})/2 \qquad \text{eq. 5}$$

$$V_w = -V_u \qquad \text{eq. 6}$$

Figure 7:
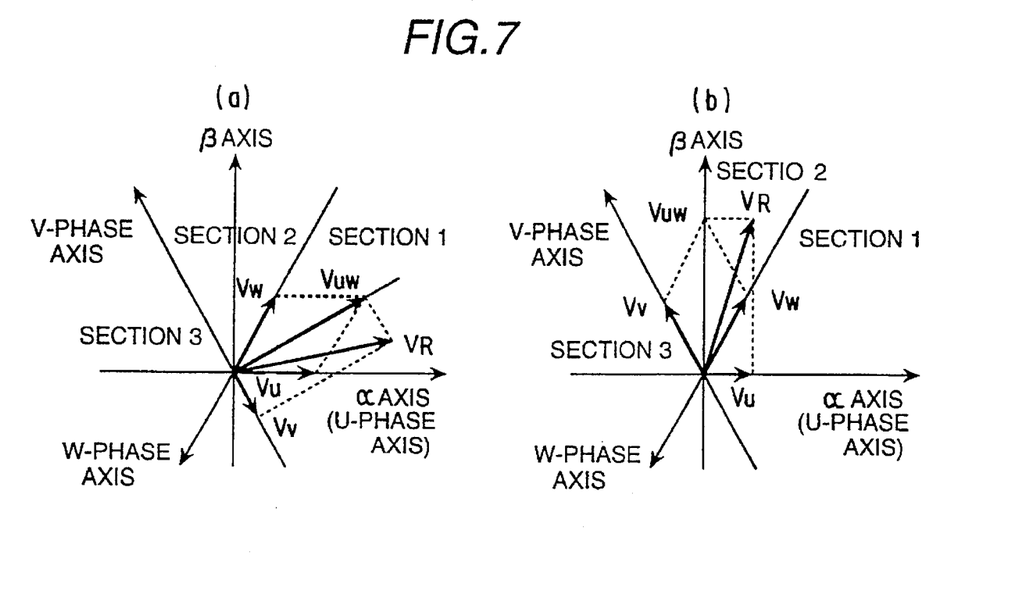

With reference to FIG. 7 (a), through this computation, voltage command vector $V_R$ is distributed to voltage commands $V_u$, $V_v$, $V_w$ for each phase. That is, in FIG. 7(a), voltage command vector $V_R$ is divided into two orthogonal vector components: V-phase voltage command $V_v$ and voltage command $V_{uw}$ orthogonal thereto. Then, voltage command $V_{uw}$ is divided into U-phase voltage command $V_u$ and W-phase voltage command $V_w$.

Each voltage command for each phase can be obtained in this manner described above. This is what is intended by computation in step 110 (that is, to obtain respective voltage commands for respective phases through use of α axis voltage command $V_\alpha$ and β axis voltage comparison value $V_{\beta 3}$). These computational equations can be obtained from the vector diagram depicted in FIG. 7(a). Here, also, since computation can be reduced to simple add/subtract and shift operations by using β axis voltage comparison value $V_{\beta 3}$ in place of β axis voltage command $V_\beta$ (for example, multiply by 3→add 3 times; ½→shift operation), computing time in a microprocessor or the like can be minimized advantageously.

A significant aspect of the invention is the manner in which the voltage command vector is divided or transformed, the meaning and consequence of which will be described in the following. Improvement of the voltage utilization factor implies minimizing the absolute value of a maximum or minimum value among three phase voltage command values for the same voltage command vector $V_R$. In order to accomplish such improvement, it becomes necessary first to obtain each voltage command for each phase such that the absolute values of the maximum and the minimum values coincide. This can be done directly through the steps of vector division as described in FIG. 7.

Assuming that mode signal MD=1 (the voltage command vector lies in section 1), and that each voltage command of each phase has a normal sinusoidal wave voltage, the maximum or minimum of the three phase voltage commands belongs to the U-phase voltage command $V_u$ or the W-phase voltage command $V_w$, and not to V-phase voltage command $V_v$. Therefore, it is most important in this section 1 to be able to divide the voltage command vector such that the absolute values of U-phase voltage command $V_u$ and W-phase voltage command $V_w$ coincide.

A principal feature of this embodiment of the present invention resides in the fact that such vector division can be executed directly through simple calculation methods. In the step of vector transformation, an auxiliary axis which is orthogonal to the V-phase axis is used to facilitate vector transformation. Then, this auxiliary line orthogonal to the V-axis causes the angle between U-axis and W-axis to be divided by two, i.e., 30°, each. Voltage command $V_{uw}$ divided from vector VR and projected on this auxiliary line is further divided into components on the U-axis and the W-axis. Consequently, absolute values of the U-phase voltage command $V_u$ and the W-phase voltage command $V_w$ thus obtained are adapted to coincide with each other always in section 1. Such computational procedures are automatically executed in step 110, by means of simplified arithmetic operations.

If mode signal MD=2 in step 109 (i.e., $V_R$ lies in section 2 of FIG. 6), the process goes to step 111, where each voltage command of each phase can be obtained still more easily as follows.

$$V_u = V_\alpha \qquad \text{eq. 7}$$

$$V_v = V_{\beta 3} \qquad \text{eq. 8}$$

$$V_w = -V_v \qquad \text{eq. 9}$$

A typical method of dividing vector $V_R$ in this instance (i.e., in section 2) is indicated in FIG. 7(b). It can be understood from FIG. 7(b) that the U-phase voltage command $V_u$ coincides with $\alpha$ axis voltage command $V_\alpha$, that the V-phase voltage command $V_v$ equals $\beta$-axis voltage comparison value $V_{\beta 3}$, and that the W-phase voltage command $V_w$ equals $\beta$-axis voltage comparison value $V_{\beta 3}$ with its sign inverted. When vector $V_R$ belongs to section 2, the voltage utilization factor can be improved by arranging such that absolute values of V-phase voltage command $V_v$ and W-phase voltage command $V_w$ equal each other.

In mode signal MD=3 (i.e., $V_R$ belongs to section 3), each voltage command of each phase can be obtained through the processing of step 112 in FIG. 6 as follows.

$$V_w = (-V_\alpha - 3V_{\beta 3})/2 \qquad \text{eq. 10}$$

$$V_u = (V_\alpha - V_{\beta 3})/2 \qquad \text{eq. 11}$$

$$V_v = -V_u \qquad \text{eq. 12}$$

These equations can be obtained in the same manner as described above.

Figure 8:
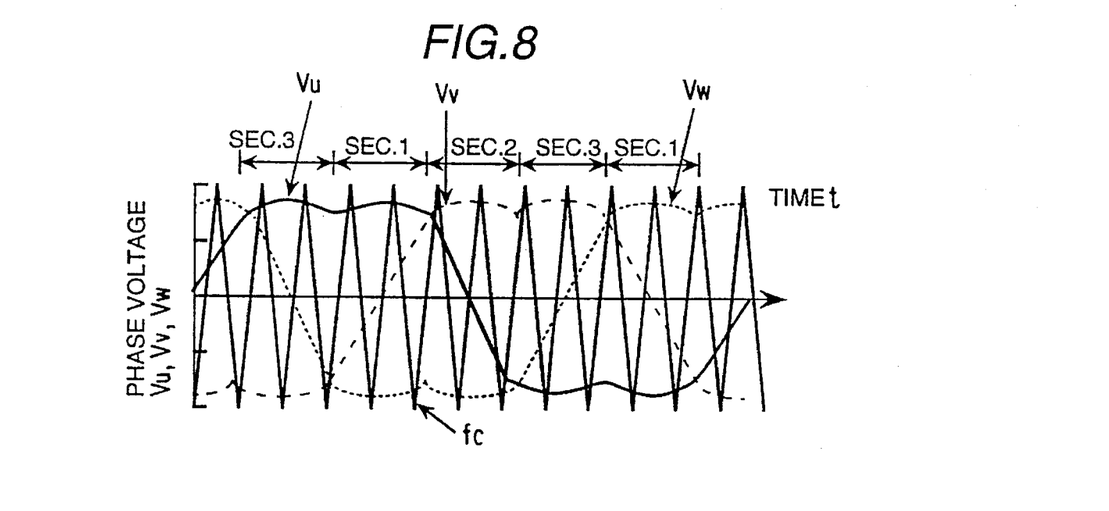
FIG. 8 is a time chart indicative of waveforms of three phase voltages obtained through processing of FIG. 6.

Through execution of the calculation procedures described above, each waveform of each phase voltage command $V_u$, $V_v$, $V_w$ is given as indicated in FIG. 8, where the maximum value of voltage of each phase has been substantially reduced. Then, as has been stated previously, each voltage command of each phase in FIG. 8 is compared with carrier wave $f_c$ to produce respective PWM signals.

As has been described above, since an appropriate voltage that can improve the voltage utilization factor can be output through the substantially simplified computing operations from an inverter according to this embodiment of the invention, a higher line-to-line voltage of sinusoidal wave can be obtained. Therefore, this arrangement has the advantage that a standard low-priced controller can be used to control three phase AC currents to be supplied, with its distortion minimized in a wider range. In particular, even where the power supply voltage varies greatly (for example, when a battery is used as a power source), this embodiment of the invention can be applied advantageously since a predetermined sinusoidal wave voltage can be output to ensure a prescribed performance of operation even if the power source voltage drops.

With reference to FIGS. 9 to 12, a second embodiment of the invention will be described in the following. The second embodiment of the invention has the same configuration as that of the first embodiment. However, the processing methods in voltage calculation circuit 5 (more particularly, the calculation methods in mode judgment unit 7 and three phase voltage generation unit 8) are different from those of the first embodiment. The main feature of the second embodiment resides in providing a simple method of computation which can be executed easily so as to hold constantly in the ON-state either an upper side or a bottom side of switching elements in any one of the three phases in a three phase power converter.

Calculation methods in mode judgment unit 7 and three phase voltage generation unit 8 in voltage calculation circuit 5 (FIG. 1) will be described in the following.

Figure 9:
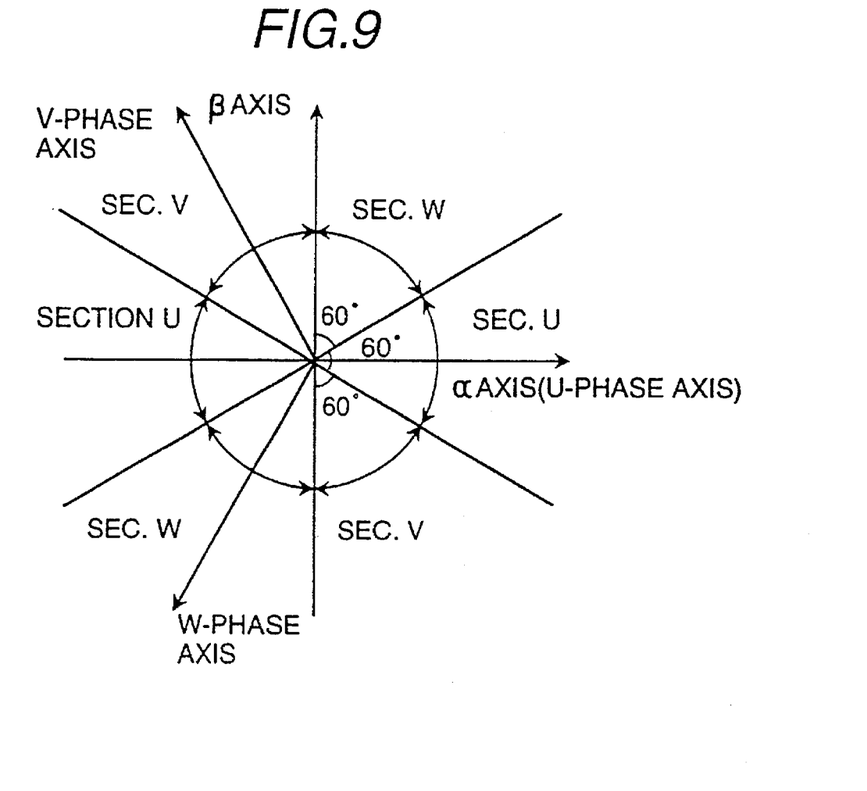
FIG. 9 is a vector diagram representing three sections to be determined by mode judgment unit 7 in order to minimize the switching loss in the power conversion circuit according to the second embodiment of the invention.

FIG. 9 is a vector diagram depicting respective sections defined in mode judgment unit 7, which sections are somewhat different from those in FIG. 4. In this embodiment, each section (U, V and W) is defined as an area having a phase axis in the center thereof; each such area thus extends ±30° from the center axis thereof, covering 60° of angle width.

Figure 10:
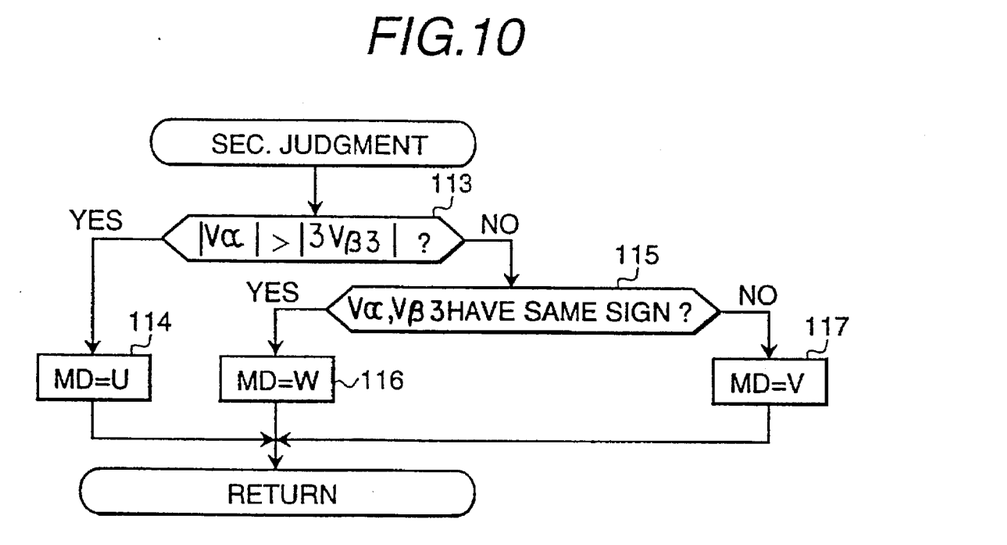
FIG. 10 is a flowchart indicative of processing steps in the mode judgment unit 7 to be executed to minimize the loss in the power converter circuit.

FIG. 10 is a flowchart which shows the processing executed in mode judgment unit 7 to determine respective sections defined in FIG. 9. In step 113, it is determined whether or not the voltage command vector $V_R$ is in section U, by comparing the absolute value of the $\alpha$ axis voltage value $V_\alpha$ and three times the absolute value of the $\beta$ axis voltage comparison value $V_{\beta 3}$ (that is, the value of $\beta$ axis voltage command $V_\beta$ multiplied by $\sqrt{3}$). This procedure of judgment is based on the same concept as described in FIG. 4 with respect to the judgment of section 2. If the absolute value of $\alpha$ axis voltage command $V_\alpha$ is greater than $3V_{\beta 3}$, $V_R$ is determined to be in section U, and accordingly, in step 114 mode signal MD is set at U. If the absolute value of $\alpha$ axis voltage command $V_\alpha$ is smaller than three times the absolute value of $\beta$-axis voltage comparison value $V_{\beta 3}$, the process goes to step 115 where a subsequent judgment is made based on the signs of the $\alpha$ axis voltage command $V_\alpha$ and the $\beta$-axis voltage comparison value $V_{\beta 3}$. When both of them have the same sign, $V_R$ is judged to belong to section W as can be seen from FIG. 9, and mode signal MD is set at W in step 116. However, when they have different signs, $V_R$ is judged to belong to section V, and mode signal MD is set at V. As described above, this second embodiment of the invention also has an advantage that the section determination can be accomplished simply and easily.

Figure 11:
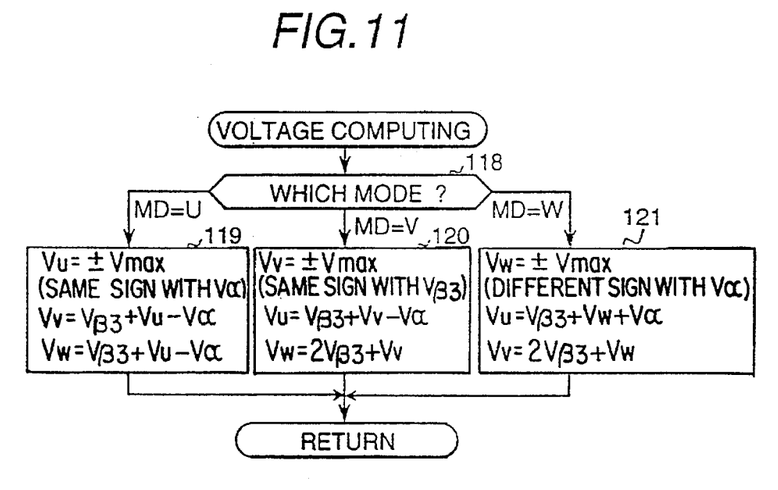
FIG. 11 is a flowchart of calculation methods to calculate respective three phase voltage command values to be executed in three phase voltage generation unit 8 in order to reduce the loss in the power converter circuit.

The processing steps executed in the three phase voltage generation unit 8 (FIG. 1) to implement this embodiment 2 of the invention are expressed in a flowchart of FIG. 11. In step 118, the value of mode signal MD is determined, and the flow goes to step 119, 120 or 121, depending on whether MD=U, MD=V or MD=W. When $V_R$ belongs to section U, each phase voltage command is calculated to yield a predetermined voltage command vector $V_R$ while constantly maintaining either the upper arm or bottom arm of U-phase in power converter circuit 2 in an ON-state.

Figure 12:
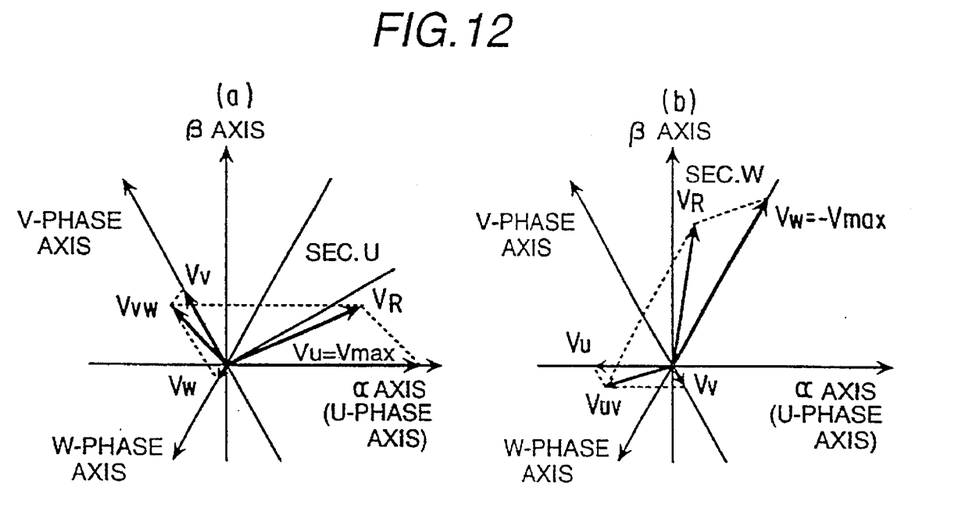

A vector diagram at this instant is indicated in FIG. 12 (a). In this drawing, voltage command vector $V_R$ is located in section U. Since $\alpha$ axis voltage command $V_\alpha$ has a positive sign, U-phase voltage command $V_u$ is set at $V_{max}$—the maximum value which can be produced as a phase voltage. (This is what is intended by the processing of U-phase voltage command $V_u$ in step 119. That is, in this manner the upper arm of U-phase is constantly in the ON-state.) In order to yield the predetermined voltage command vector $V_R$ as a vector sum while holding $V_u=V_{max}$ in FIG. 12(a), V-phase voltage command $V_v$, and W-phase voltage command $V_w$ must be determined such that their vector sum equals voltage vector $V_{vw}$ which is to be obtained by subtracting vector $V_u$ from vector $V_R$. Thus, calculation in step 119 determines V-phase voltage command $V_v$, and W-phase voltage command $V_w$, which typically represent the vector diagram of FIG. 12(a), which are given by the following equations.

$$V_u = \pm V_{MAX}(\text{same sign as } V_\alpha) \qquad \text{eq. 13}$$

$$V_v = V_{\beta 3} + V_u - V_\alpha \qquad \text{eq. 14}$$

$$V_w = -V_{\beta 3} + V_u - V_\alpha \qquad \text{eq. 15}$$

These equations can be obtained from the vector diagram of FIG. 12(a). The calculation in step 119 includes only a simple arithmetic operation of addition and subtraction, so that a low-priced microprocessor can be advantageously employed for this purpose.

Steps 120 and 121 represent processing for sections V and W, respectively. Namely, the following equations are calculated therein, respectively.

$$V_v = \pm V_{max}(\text{same sign as } V_{\beta 3}) \qquad \text{eq. 16}$$

$$V_u = -V_{\beta 3} + V_v + V_\alpha \qquad \text{eq. 17}$$

$$V_w = -2V_{\beta 3} + V_v \qquad \text{eq. 18}$$

$$V_w = \pm V_{max}(\text{opposite sign of } V_{\beta 3}) \qquad \text{eq. 19}$$

$$V_u = V_{\beta 3} + V_w + V_\alpha \qquad \text{eq. 20}$$

$$V_v 2V_{\beta 3} + V_w \qquad \text{eq. 21}$$

These equations can be obtained in the same manner as obtained for section U.

By way of example, FIG. 12(b) shows the voltage command vector $V_R$ in section W, and hence the β axis voltage command $V_\beta$ is positive. In this case, W-phase voltage command $V_w$ is set at $-V_{max}$ which is a minimum value of phase voltage. (Note that this section W is bisected by the negative W axis, which is why $V_w$ is set to a negative value $-V_{max}$.) Thus, the bottom arm of W-phase in power converter circuit 2 is constantly held in the ON-state. The other two components, i.e., U-phase voltage command $V_u$ and V-phase voltage command $V_v$ are calculated in step 121 so that a vector sum of these three phase components produces predetermined voltage command vector $V_R$. In the computation steps 119–121 in FIG. 11, since The β axis voltage comparison value $V_{\beta 3}$ is used, there arises an advantage that the computation can be accomplished simply by add and subtract operation.

Figure 13:
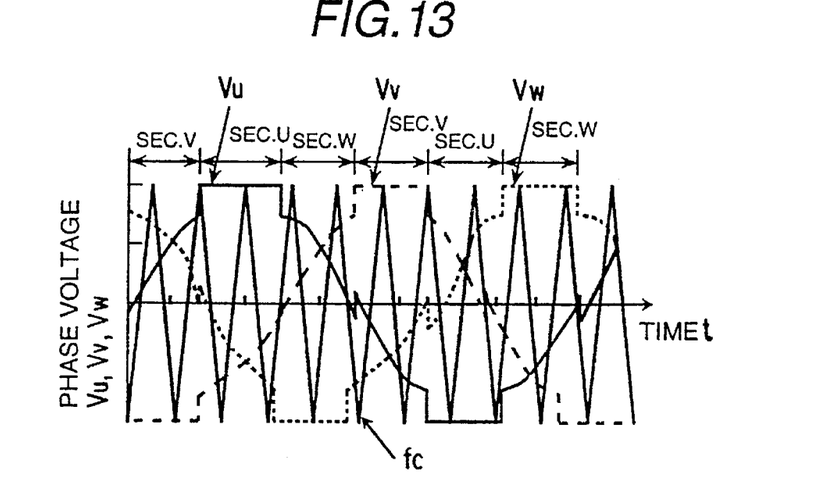
FIG. 13 is a time chart indicative of waveforms of three phase voltages obtained through the processing of FIG. 11.

Respective waveforms of the three phase voltage commands $V_u$, $V_v$ and $V_w$ obtained through the processing described above are shown in FIG. 13. That is, through the processing of FIGS. 10 and 11, since one of three phases for forming PWM signals can maintain either its upper arm or bottom arm in a constantly ON-state, the number of switching operations can be reduced to ⅔ the number normally required. Therefore, since a loss associated with switching can be reduced substantially according to this embodiment of the invention, there is an advantage that the efficiency of the power converter circuit 2 can be improved substantially.

A third embodiment of the invention will be described with reference to FIG. 14. The third embodiment of the invention further comprises temperature sensor 13 for detecting temperatures in power converter circuit 2, and temperature signal processing unit 14 in voltage calculation circuit 5 for enabling a sensed and processed temperature TEMP to be utilized in arithmetic operation in mode judgment unit 7 and three phase voltage generation unit 8.

Figure 15:
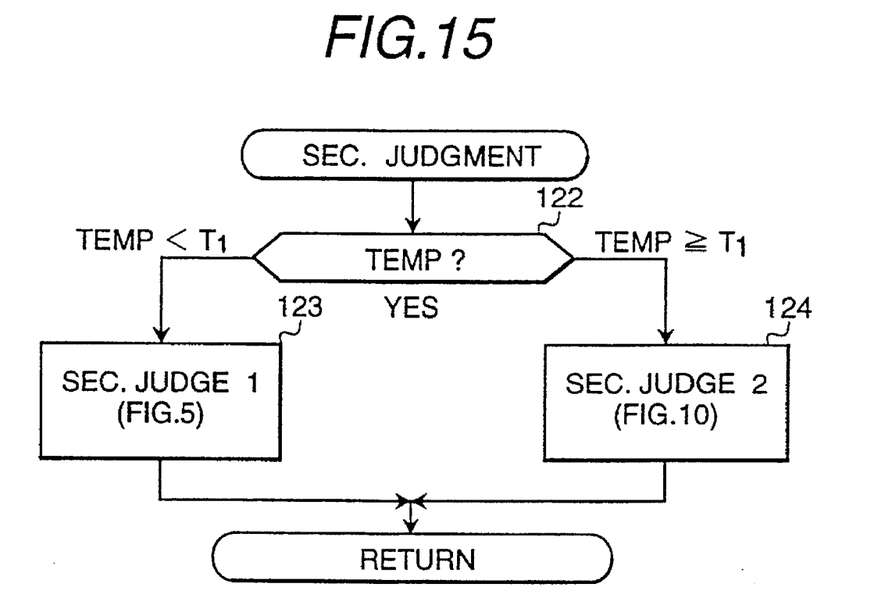
FIG. 15 is a flowchart indicative of processing steps in mode judgment unit 7 wherein its section judgment method is switched over between two optional methods depending on temperatures in the power converter circuit.

FIG. 15 is a flowchart indicating processing steps in mode judgment unit 7. In step 122, it is determined whether the temperature signal TEMP is higher or lower than a first temperature limit value $T_1$. If the temperature signal TEMP is lower than the first temperature limit value $T_1$, the process jumps to step 123. If higher than the first temperature limit value $T_1$, the process jumps to step 124. In step 123, since a low temperature is sensed in power conversion circuit 2, section judgment processing for improving the voltage utilization factor as indicated in FIG. 5 is executed (referred to as section judgment 1). In step 124, selected when the sensed temperature in power conversion circuit 2 is higher than the first temperature limit value $T_1$, the processing indicated in FIG. 10 is executed for reducing the switching loss (referred to as section judgment 2).

Figure 16:
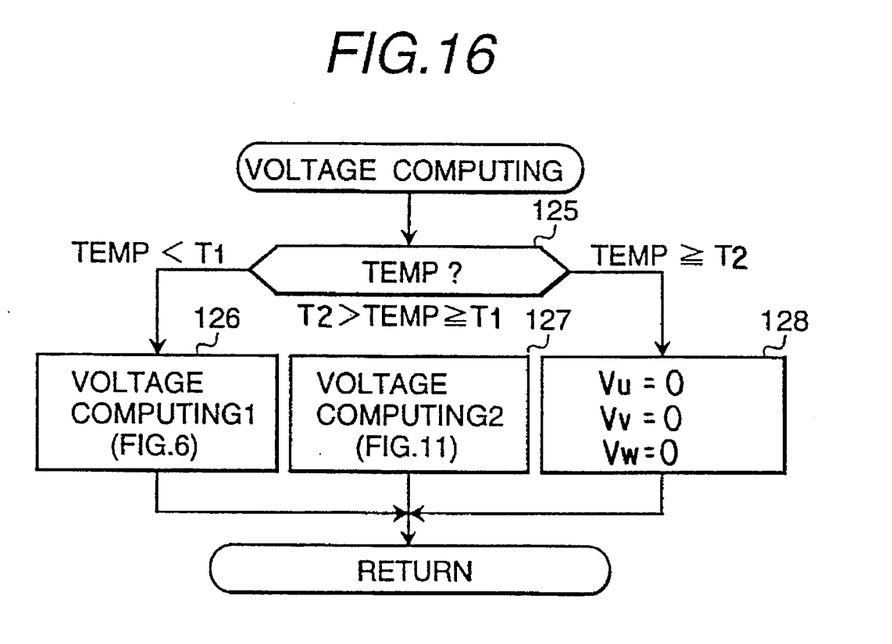
FIG. 16 is a flowchart indicative of calculation methods to calculate respective voltage command values to be executed in three phase voltage generation unit 8 in order to switch over its section judgment methods depending on the temperatures in the power converter circuit.

Now, with reference to FIG. 16, the processing steps to be executed in three phase voltage generation unit 8 will be described. In step 125 subsequent steps to be executed are divided into three steps depending on the magnitude of the temperature signal TEMP. The relationship between the first temperature limit value $T_1$ and the second temperature limit value $T_2$ which appears in FIG. 16 is assumed that $T_1<T_2$. When temperature signal TEMP is lower than the first temperature limit value $T_1$, the process advances to step 126 where the voltage calculation indicated in FIG. 6 is executed (referred to as voltage computation 1), causing a higher sinusoidal wave line-to-line voltage to be generated in a lower phase voltage command range as described above, so that the voltage utilization factor can be improved. When temperature signal TEMP is higher than the first temperature limit value $T_1$ but less than the second temperature limit value $T_2$, the flow goes to step 127 where voltage calculation is executed to allow only two of three phases to be switched (referred to as voltage computation 2). This step corresponds to the processing described with reference to FIG. 11, whereby the loss in power conversion circuit 2 can be reduced, suppressing the temperature rise in the power conversion circuit 2 controllable under the first temperature limit value $T_1$ without changing the line-to-line voltage, simply through use of the voltage calculation circuit 5. Further, when temperature signal 24 exceeds the second temperature limit value $T_2$, it is judged as an abnormal temperature, and in step 128, each voltage command values $V_u$, $V_v$ and $V_w$ is set at 0, and at the same time, processing to stop operation of power conversion 5 circuit 2 is executed.

According to this third embodiment of the invention, during the time the temperature is low, the voltage utilization factor can be improved as in the first embodiment of the invention. Further, when the temperature in the power conversion circuit 2 has increased, alternatively the switching loss can be reduced while maintaining the normal line-to-line voltage as in the second embodiment of the invention, thereby substantially improving the reliability of operation, without degrading the performance.

Figure 14:
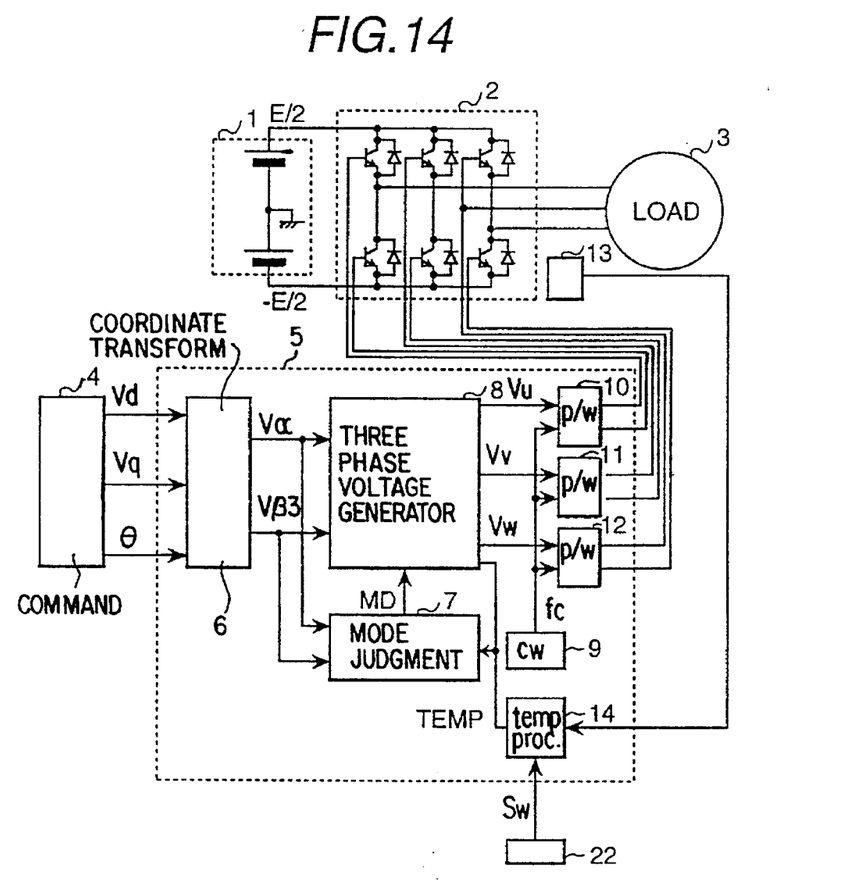
FIG. 14 is a schematic block diagram of a third embodiment of the invention.

Further, as shown in FIG. 14, external switch 22 can be added to temperature signal processing unit 14 so that the switch signal Sw can be entered, causing a shift to a voltage command which minimizes the switching loss. For example, when switch signal Sw is on, the converter operates in the loss minimization mode, and when it is off, the mode resets. Through such arrangements, when switch signal Sw is off, temperature signal processing unit 14 outputs a sensed value as detected by sensor 13 as the temperature signal TEMP. In contrast, when switch signal Sw is on, the following processing will be conducted with respect to temperature signal TEMP: when the value sensed by the sensor 13 is lower than the first temperature limit value $T_1$, temperature signal TEMP is set at $T_1$. When, on the other hand, the sensed value is higher than $T_1$, the value as sensed is set as temperature signal TEMP. According to this processing, the phase voltage calculation method can be switched over manually through operation of switch signal Sw only when the temperature of power conversion circuit 2 is lower than $T_1$.

Thereby, at low temperatures, since voltage computation for reducing the switching loss is manually selectable, when no major problem is anticipated to arise due to current fluctuation or magnetic noise, a switching loss minimization strategy may be selected manually.

Figure 17:
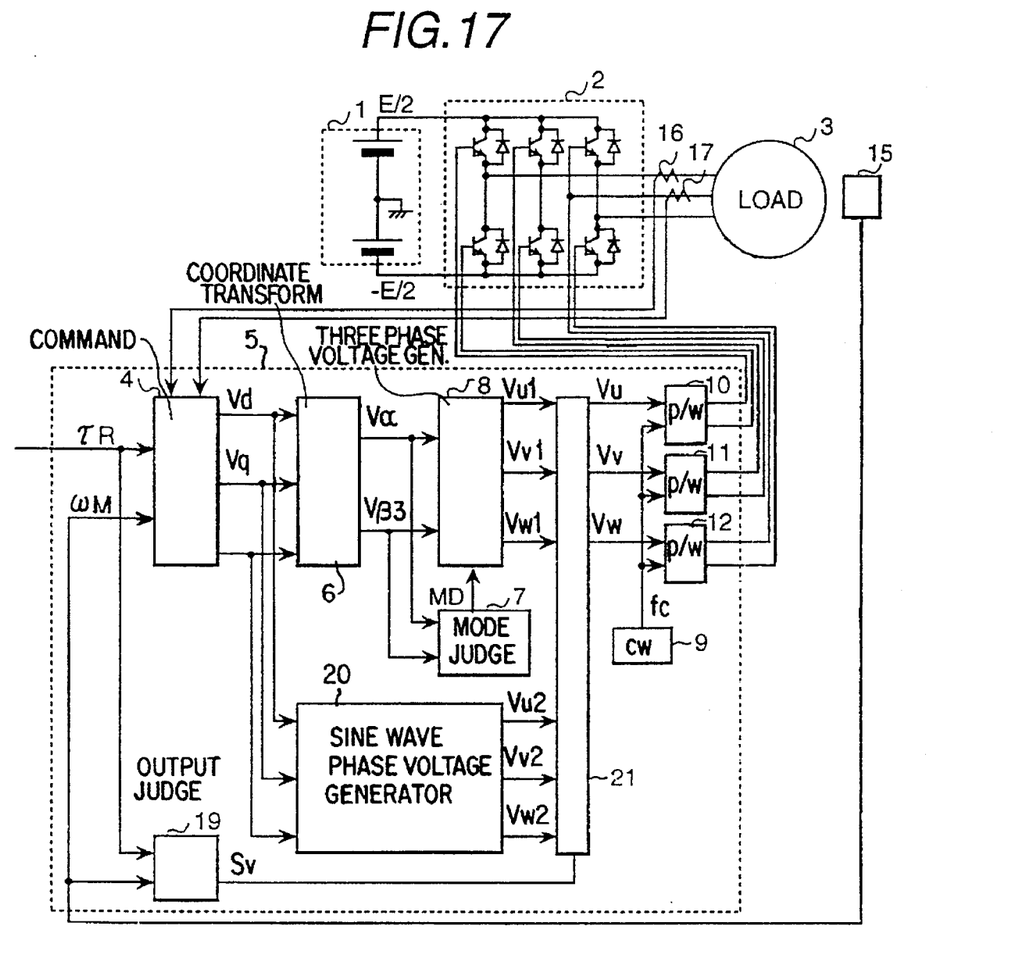
FIG. 17 is a schematic block diagram of a fourth embodiment of the invention.

A fourth embodiment of the invention is shown in FIG. 17. The fourth embodiment of the invention comprises an arrangement for switching over between methods of generating voltage commands, (whether to improve the voltage utilization factor or to minimize any distortion from the sinusoidal wave), depending on the magnitude of the motor output.

In the drawing of FIG. 17, a speed sensor 15 is provided for detecting motor speed $\omega_M$ of three phase AC motor 3, and current sensors 16, 17 detect the output currents of two phases in power conversion circuit 2. These detected signals are supplied to control unit 18, which is also supplied with torque command $\tau_R$ designating a torque for three phase AC motor 3. In the rotating coordinate system voltage command circuit 4 in control unit 18, a known vector control calculation is conducted as described above. More particularly, in response to torque command $\tau_R$ and motor speed $\omega_M$ there are calculated excitation current command $i_{MR}$ for generating a magnetic flux, torque current command $i_{TR}$ for producing torque, and rotation angle θ of rotating flux of the rotating coordinate system with respect to the stationary coordinate system. Based on the two phase output currents from power conversion circuit 2, excitation current $i_M$ and torque current $i_T$ of three phase AC motor 3 are obtained for use in feedback current control. As a result, d-axis voltage command $V_d$ and q-axis voltage command $V_q$ defined on the rotating coordinate system are obtained.

Figure 18:
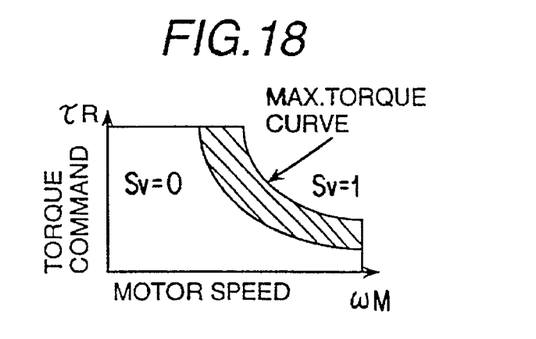
FIG. 18 is a characteristic diagram of torque motor speeds indicating an areas of output mode switchover signal Sv which are calculated in output judgment unit 19 in FIG. 17.

Subsequent arithmetic operations conducted on the basis of these voltage commands in the rotating coordinate transformation unit 6, the mode judgment unit 7, and the three phase voltage generation unit 8 are the same as in the first embodiment described with reference to FIG. 1. Accordingly, three phase voltage commands, $V_{u1}$, $V_{v1}$, $V_{w1}$ respectively, are calculated which improve the voltage utilization factor. In addition, the sinusoidal wave phase voltage generation unit 20, calculates α and β axis voltage commands $V_\alpha$ and $V_\beta$ for the stationary coordinate system, using the same step of coordinate transformation as in the rotating coordinate system transformation unit 6, and applies a well-known two phase-to-three phase conversion processing to obtain respective phase voltage commands $V_{U2}$, $V_{v2}$, $V_{w2}$. Voltage commands $V_u$, $V_v$, $V_w$ until then are sinusoidal waves with a normal voltage waveform which have not improved the voltage utilization factor yet. From torque command $\tau_R$ and motor speed $\omega_M$, output judgment unit 19 generates a mode switchover signal Sv based on the regions indicated in FIG. 18. When Sv=0, a low output region is designated, wherein each phase voltage to be applied to three phase AC motor 3 has a relatively low value. In contrast, when Sv=1, a high output region is designated, wherein each phase voltage has a high value in the vicinity of a maximum value. This output mode switchover signal Sv is input to voltage switchover unit 21 where, when Sv=0, voltage commands $V_{u2}$, $V_{v2}$, $V_{w2}$ from sinusoidal wave phase voltage generation unit 20 are output to PWM generation unit 10, 11, 12. When Sv=1, voltage switchover unit 21 switches over voltage commands to $V_{u1}$, $V_{v1}$, $V_{w1}$ output from three phase voltage generation unit 8.

Through the processing described above, the power conversion circuit 2 selectably outputs a phase voltage having a normal sinusoidal waveform in the low output region when its phase voltage is not high, and a phase voltage to improve the voltage utilization factor in the high output region. Normally, each waveform of each phase at the time for improving the voltage utilization factor is not sinusoidal but is intended to make the line-to-line voltage sinusoidal. Thereby, when there is a deviation in the delay in each actual phase voltage responsive to each phase voltage command, the resultant line-to-line voltage may not be necessarily sinusoidal. According to this embodiment of the invention, however, the line-to-line voltage is ensured to be sinusoidal even if there exists a delay in phase voltage in the low output region, and a high output voltage is also ensured to be obtained in the high output region.

The embodiments of the invention have been described hereinabove by way of example as applied to vector control; however, they are not limited to such control, and can be applied also to drive AC motors or load controlled by any voltage command which improves the voltage utilization factor through simple control processing within the scope of the invention. Further, the method of switching over between the processing for improving the voltage utilization factor and that for minimizing the switching loss can be effected based not only on the temperature in the power conversion circuit but also based on the magnitude of the power supply voltage, or even manually.

The present invention, offers the advantage that a high performance power converter can be provided which can substantially improve the voltage utilization factor since the output line-to-line voltage from the power conversion circuit can be supplied in a sinusoidal waveform up to a higher voltage region through use of a low-priced control computing device.

Another advantage of the invention is that the voltage utilization factor can be improved through use of simple control calculation methods to process the voltage command vector given in the rotating coordinate system and effect coordinate transformation.

Further, still another advantage lies in the fact that the power converter of the invention can improve its performance substantially when applied to a drive system having a battery or other power supply with a voltage which varies significantly, since its line-to-line voltage can be supplied in sinusoidal waveforms in a wider range.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A power converter apparatus having a control unit which calculates three phase voltage command values in response to a given voltage command vector, and produces PWM signals based on the calculated values, and a power converter circuit having a plurality of switching elements, comprising:

coordinate transformation means for transforming said voltage command vector into an α axis voltage command value and a β axis voltage command value in a stationary coordinate system, the α and β axes being orthogonal to each other;

section determination means for determining which of a plurality of sections of said stationary coordinate system contains said voltage command vector exists;

three phase voltage calculation means for selecting at least a formula for calculating said three phase voltage command values based on which section of said coordinate system is determined to contain said voltage command vector, and for calculating said three phase voltage command values using said α axis voltage command value and β axis voltage command value; and means for controlling switching of said switching elements in response to said three phase voltage command values.

2. A power converter apparatus according to claim 1 wherein said section determination means causes one axis of the stationary coordinate system to coincide with one axis of three phase axes corresponding to the three phase voltage command values, and determines the section which contains the voltage command vector based on a each sign and a magnitude of each voltage command value on the α axis and the β axis in the stationary coordinate system, the α and β axes being orthogonal.

3. A power converter apparatus according to claim 2 wherein said section determination means determines the section which contains said voltage command vector by comparing the α axis voltage command value with a β axis transformation value which is obtained by multiplying the β axis voltage command value by $1/\sqrt{3}$.

4. A power converter apparatus according to claim 1 wherein said three phase voltage calculation means calculates respective three phase voltage command values using a β axis transformation command value and an α axis voltage command value such that absolute values of two phase output voltages which are predetermined for each section coincide with each other.

5. A power converter apparatus according to claim 2 wherein said section determination means determines the section which contains the voltage command vector by comparing the α axis voltage command value with a β axis transformation command value which is obtained by multiplying the β axis voltage command value of the stationary coordinate system by $\sqrt{3}$.

6. A power converter apparatus according to claim 1 wherein the three phase voltage calculation means constantly holds in an ON-state either of an upper arm and a bottom arm of one phase predetermined for each section, calculating remaining output voltage command values such that a vector sum of these three components of output voltage command values yields the voltage command vector.

7. A power converter apparatus according to claim 1 further comprising means for detecting at least one of a temperature of switching elements and a power supply voltage, and means for making said section determination and calculating the three phase voltage command values, based on one of a detected temperature and power supply voltage.

8. A power converter apparatus according to claim 7 further comprising means for changing a section determination mode in response to at least one of a sensed temperature of switching elements and a detected power supply voltage, between a section determination carried out by comparing an α axis voltage command value and a β axis transformation command value which is obtained by multiplying the β axis voltage command value of the stationary coordinate system by $1/\sqrt{3}$, and a section determination carried out by comparing an α axis voltage command value and a β axis transformation command value obtained by multiplying the β axis voltage command value of the stationary coordinate system by $\sqrt{3}$.

9. A power converter apparatus according to claim 7 further comprising a means for changing a calculation of said three phase voltage command values in response to at least one of a sensed temperature of said switching elements and a detected power supply voltage, between a calculation using the β axis transformation command value and the α axis voltage command value in a manner such that absolute values of two phase output voltages predetermined for each said judged section coincide with each other; and a calculation in which, while holding in a constantly ON-state either of an upper arm or a bottom arm of one phase predetermined for each said judged section, remaining output voltage command values are calculated so that a vector sum of these calculated vector components yields the voltage command vector.

10. A power converter apparatus according to claim 7 further comprising an external mode changeover switch for manually selecting modes for section determination and calculation of three phase voltage command values.

11. A power converter apparatus according to claim 1 wherein the voltage command vector comprises voltage command component values defined by two orthogonal axes on the rotating coordinate system.

12. A power converter apparatus for driving a motor, of the type having a control unit responsive to a torque command and a motor speed, for producing a voltage command vector which is given as a rotating coordinate voltage command value defined by reference to two orthogonal axes in a rotating coordinate system, calculating three phase voltage command values based on said voltage command vector, and producing PWM signals; and a converter circuit having a plurality of switching circuits comprising:

a coordinate transformation means for transforming said voltage command vector defined by reference to the rotating coordinate system to voltage command values defined by reference to orthogonal α and β axes on a stationary coordinate system;

a section determination means for determining which of a plurality of sections of the stationary coordinate system contains said voltage command vector;

a three phase voltage calculation means for selecting at least a formula for calculating said three phase voltage command values based on which section of said coordinate system is determined to contain said voltage command vector, and for calculating said three phase voltage command values utilizing said voltage command values by reference to said α and β axes;

a sinusoidal wave phase voltage generation means for causing two phase-to-three phase conversion of said voltage command vector;

an output judgment means for changing an output mode in response to said torque command and motor speed; and a voltage switchover means for switching between a voltage command from said sinusoidal wave phase voltage generation means and a voltage command from said three phase voltage generation means.

13. A power converter apparatus according to claim 12 wherein the output judgment means changes said output mode in response to the torque command and the motor speed, and based upon a determination whether a voltage of each phase to be applied to a three phase AC motor is in a relatively low output region or in a high output region in the vicinity of a maximum value thereof.

14. In a power converter apparatus of the type having a control unit responsive to a voltage command vector defined by two orthogonal axis rotating coordinate voltage command values relative to a rotating coordinate system, for calculating three phase voltage commands to produce PWM signals corresponding thereto, and a plurality of switching elements which in response to said PWM signals inverts a DC power supply into three phase AC output voltages, wherein said control unit comprising:

a coordinate conversion means for converting said voltage command vector to voltage command values which are defined by two orthogonal $\alpha$ axis and $\beta$ axis voltage command values relative to a stationary coordinate system; and a three phase voltage calculation means for calculating said three phase output voltage command values based on said $\alpha$ axis and $\beta$ axis voltage command values.

* * * * *